Oct. 19, 1965 P. GIEB 3,213,400
MEMBRANE-TYPE STRAIN GAUGE
Filed Nov. 24, 1961
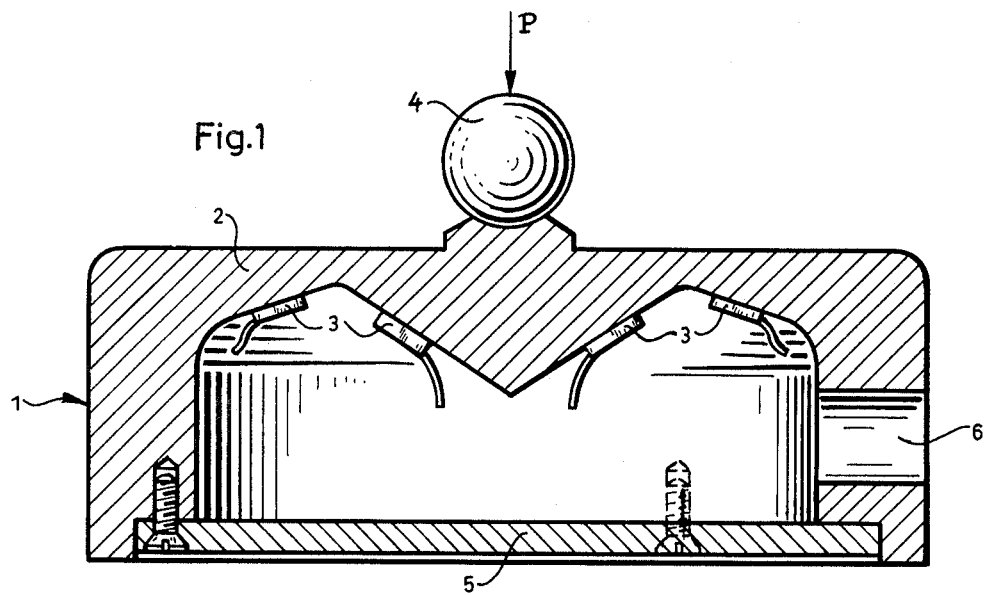
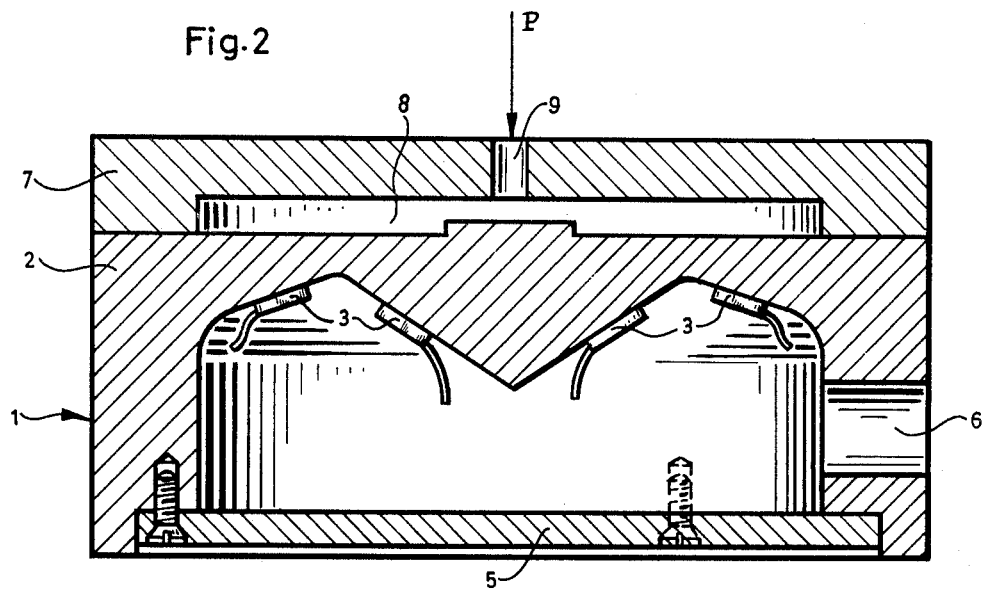
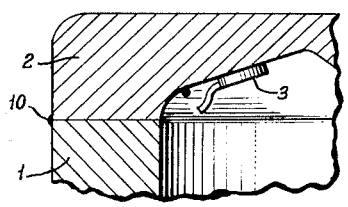

3,213,400
MEMBRANE-TYPE STRAIN GAUGE

Philipp Gieb, Durmersheim, Germany, assignor to Siemens & Halske Aktiengesellschaft, Berlin and Munich, Germany, a corporation of Germany
Filed Nov. 24, 1961, Ser. No. 154,456
Claims priority, application Germany, Nov. 29, 1960, S 71,452
6 Claims. (Cl. 338—4)

This invention is concerned with force measuring devices and fluid pressure measuring devices, also referred to as stress or strain gauges, operating with strain measuring strips cemented to an elastically deformable measuring body, the electrical resistance of such strips changing in accordance with mechanical stresses in the part of the measuring body to which they are cemented.

There are strain gauges known wherein a measuring cylinder or a measuring rod is subjected to pressure or to tensile stresses. The measuring rod is usually disposed within a protective housing and supported therein against transverse forces by means of membranes. Such strain gauges can be produced with great precision but the production thereof calls for considerable expenditure owing to the relatively great number of construction elements required therefor.

Strain gauges comprising a membrane which is fastened on all sides and subjected to bending stresses can be produced simpler as well as at lower cost and with reduced size. It was found, however, that membranes with uniform thickness, used for this purpose, exhibit rather poor measuring properties. In the case of strain gauges operating with strain measuring strips, it is generally speaking always endeavored to connect the strips as elements of a resistance bridge and to position such strips so that they are pair-wise deformed in opposite directions, thereby augmenting the measuring effect. However, upon membranes of uniform thickness, there are hardly any places to be found which are subjected to constant bending stresses and upon which the strain measuring strips could be cemented.

The present invention overcomes this drawback by furnishing a strain gauge operating with strain measuring strips, such gauge being provided with a measuring body in the form of a membrane which is fastened on all sides and has a central area which is substantially resistant to bending. According to the invention, the membrane has a region of minimum thickness extending annularly intermediate of its fastened rim and the center portion which is substantially resistant to bending and subjected to a load, the thickness of said intermediate region increasing progressively in the direction of the parts which are resistant to bending, the strain measuring strips being provided upon the flanks of the progressively thickening membrane parts.

It was found that the bending stresses are substantially constant along sufficiently large sections of the noted flanks. Moreover, the flanks lying directly adjacent to the part of minimum thickness exhibit oppositely acting bending stresses, thus making it possible to employ the previously mentioned bridge circuit for the strain measuring strips.

The membrane may be formed with a substantially plane surface on one side thereof. The firm fastening of the membrane rim can be effected by making the rim so as to form a transition to a cylindrical shape, such transition being substantially resistant to bending. The gauge is in this way formed by the membrane and the cylindrical part, resulting in exteriorly smooth planes, and the strain measuring strips can be provided in protected manner interiorly of the gauge. If desired, the membrane and the cylindrical part may be formed integrally of one piece by machining or pressing. However, it is also possible to fasten the respective parts together by welding or by screw means.

The load can be transmitted to the membrane over its central portion which is substantially resistant to bending, for example, by means of a ball disposed on the central portion, or, in the case of liquid or gas pressures, the corresponding pressure may be caused to act upon the entire operatively effective membrane plane.

The various objects and features of the invention will appear from the description of two embodiments thereof which is rendered below with reference to the accompanying drawing.

FIG. 1 shows an embodiment in which the load is transmitted to the membrane by means of a ball acting thereon;

FIG. 2 shows an embodiment operating as a fluid pressure measuring device; and

FIG. 3 shows an embodiment in which the membrane is constructed as a separate member.

In FIG. 1, numeral 1 indicates an axially relatively short cylindrical body having its upper end closed by the membrane 2 which is formed with its outer surface extending substantially in a plane. The interior surface of the membrane 2 is formed by an angular portion extending radially inwardly from the fixedly disposed rim and tapering or diminishing in cross-sectional area to a minimum and thereafter extending angularly radially toward the center of the membrane with progressively increasing cross-sectional area. Upon the angular flanks of the respective membrane portions are cemented the strain measuring strips 3. The outer membrane surface is centrally provided with a depression containing a ball 4 for transmitting thereto the pressure of a load P. The bottom of the gauge is formed by a plate 5. The electrical conductors extending to the strain measuring strips 3 are extended through a hole 6.

The strain gauge according to FIG. 2 comprises parts corresponding to those explained in connection with FIG. 1 and identically referenced. There is in addition provided a hood 7 overlying the membrane and suitably fastened thereto in pressure-tight manner, forming with the membrane a chamber 8 into which fluid or gas pressure is conducted through an inlet port 9, such pressure loading the membrane and causing elastic deformation thereof just as deformation thereof is caused by the load in the embodiment according to FIG. 1.

As illustrated in FIG. 3, the membrane 2 may be formed as a separate member, and firmly joined with the cylindrical body 1 by suitable means, as for example, by welding 10, or by screw means.

Changes may be made within the scope and spirit of the appended claims which define what is believed to be new and desired to have protected by Letters Patent.

I claim:

1. A strain gauge comprising a membrane, means for fixedly securing said membrane circumferentially thereof, said membrane having a load-receiving central part which is substantially resistant to bending stresses, the portion of said membrane disposed intermediate its circumferentially fixedly secured part and said central part having an annularly extending area of minimum thickness, the thickness of said intermediate portion increasing progressively from said area toward said central part and said circumferentially fixedly secured part, respectively, and strain measuring means provided upon the oppositely disposed flanks of the intermediate portion of progressively increasing thickness exhibiting oppositely acting bending stresses.

2. A strain gauge according to claim 1, comprising at least four strips forming said strain measuring means.

3. A strain gauge according to claim 1, wherein the outwardly facing side of the membrane is substantially of plane configuration.

4. A strain gauge according to claim 1, comprising a cylindrical part extending circumferentially of said membrane.

5. A strain gauge according to claim 4, wherein said membrane and said cylindrical part are formed integrally.

6. A strain gauge according to claim 4, wherein said cylindrical part and said membrane are formed as two separate elements with said cylindrical part being firmly joined with said membrane.

References Cited by the Examiner
UNITED STATES PATENTS

| | | | |
|---|---|---|---|
| 2,439,146 | 4/48 | Ruge | 73—141 |
| 2,848,892 | 8/58 | Hoffman | 73—141 |
| 2,992,556 | 7/61 | Webster | 73—141 |
| 3,035,240 | 5/62 | Starr | 73—398 |

RICHARD C. QUEISSER, *Primary Examiner.*

DAVID SCHONBERG, *Examiner.*